No. 640,736. Patented Jan. 9, 1900.
G. W. BIESTER.
BICYCLE CARRIER.
(Application filed Mar. 3, 1898.)
(No Model.)
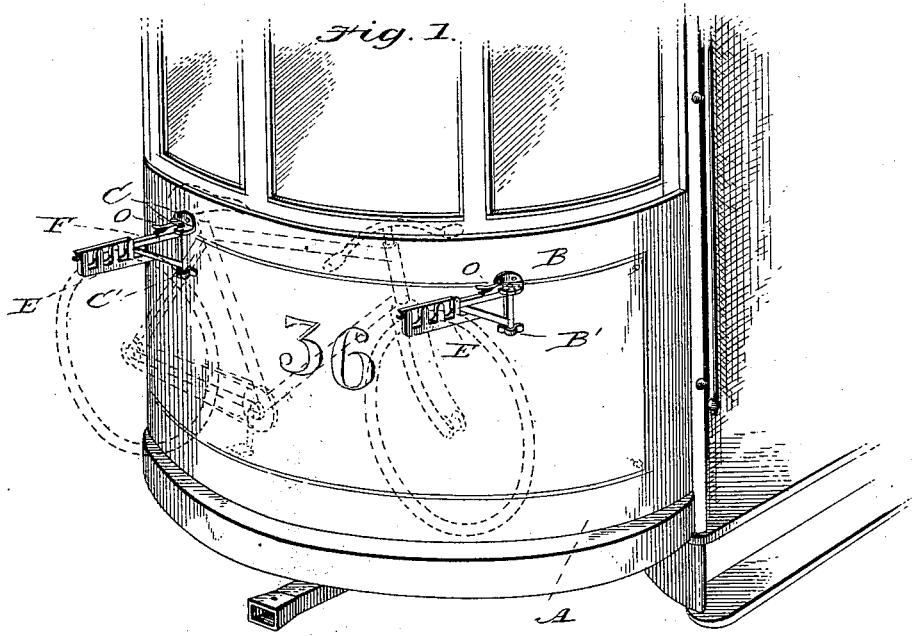
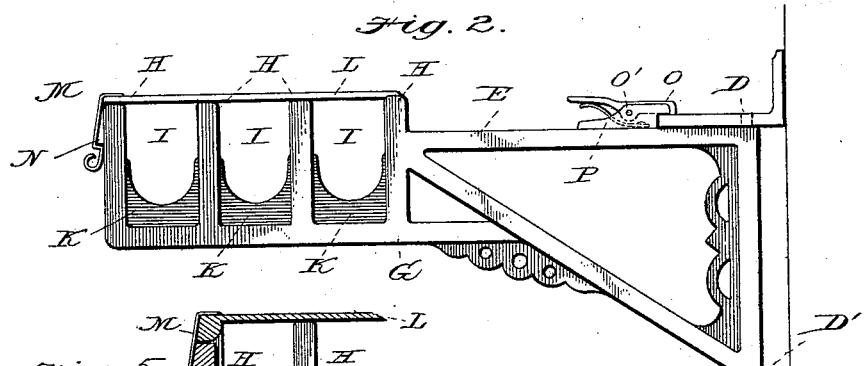
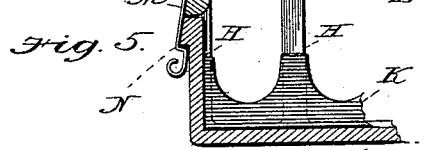
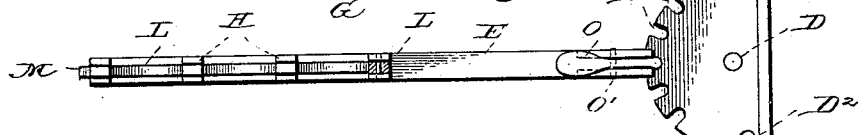
Witnesses
J. T. Cross
Chas. E. Brock
Inventor
George W. Biester,
by O'Meara
Attorneys
THE NORRIS PETERS CO., PHOTO-LITHO., WASHINGTON, D. C.

UNITED STATES PATENT OFFICE.

GEORGE W. BIESTER, OF HARRISBURG, PENNSYLVANIA, ASSIGNOR OF ONE-HALF TO ABRAHAM PETERS, OF SAME PLACE.

BICYCLE-CARRIER.

SPECIFICATION forming part of Letters Patent No. 640,736, dated January 9, 1900.

Application filed March 3, 1898. Serial No. 672,424. (No model.)

*To all whom it may concern:*

Be it known that I, GEORGE W. BIESTER, a citizen of the United States, residing at Harrisburg, in the county of Dauphin and State of Pennsylvania, have invented a new and useful Bicycle-Carrier, of which the following is a specification.

My invention relates to bicycle-carriers designed for use in carrying bicycles upon electric, cable, and like passenger cars.

The object of my invention is to furnish cheap, simple, and durable means whereby one or more bicycles may be suspended from the end or dashboard of such railway-cars.

My invention further consists in a bicycle-carrier comprising two brackets pivotally engaged in bearings secured to the end of the car, suitable recesses or spaces lined with rubber or like material to receive the rims of the front and rear wheels of a bicycle, means for securing the wheels in position, and means for securing the suspending-brackets in any radial adjustment.

My invention further consists in the improved construction, arrangement, and combination of parts hereinafter fully described and afterward specifically pointed out in the appended claim.

In order to enable others skilled in the art to which my invention most nearly appertains to make and use the same, I will now proceed to describe its construction and operation, reference being had to the accompanyings, forming part of this specification, in which—

Figure 1 is a perspective view of a portion of the rear end of a car equipped with a bicycle-carrier constructed in accordance with my invention. Fig. 2 is a detail view, in side elevation, of one of the brackets composing my improved bicycle-carrier. Fig. 3 is a top plan view thereof. Fig. 4 is a detail view illustrating, partly in section and partly in elevation, the means for securing the bracket in its radial adjustment. Fig. 5 is a central section through the outer end of one of the brackets, illustrating the latch for holding the wheel in position.

Like letters of reference mark the same parts wherever they occur in the different figures of the drawings.

Referring to the drawings by letters, A represents an end of a car to which are secured bearings B B' and C C', the bearings B and C and B' and C' being duplicates of each other and located near opposite sides of the car in order to receive the pintles D and D' of brackets E and F. These brackets are duplicates of each other, and a description of bracket E will serve for both, said bracket E being illustrated in detail in Figs. 2 to 5. The bracket is provided with an extension-arm G at the outer portion of its lower edge, from which project upwardly vertical arms H, between which are formed recesses I, the bottoms of which are provided with strips of rubber K, as clearly shown in Figs. 2 and 5.

A spring-latch L is attached at its inner end to the upper end of the inner upright H, its outer end being provided with a spring-catch M to engage over a lug N, formed on the outer end of the bracket. The bearing B has its horizontal plate of substantially semicircular shape and is provided in its periphery with notches $D^2 D^3$ to receive the end of a spring or pawl latch O, pivoted at O' between lugs P, projecting upward from the top of bracket E, the point of the latch or pawl being held normally in engagement in one of the slots $D^2 D^3$ by means of a spring Q, secured to the top of the bracket and bearing upward under the outer end of the pawl.

The construction of my invention will be readily understood from the foregoing description, and its operation may be described as follows: The brackets being pivoted by the pintles D D', they may be radially adjusted to bring them into proper position to receive the rims of the front and rear wheels of a bicycle in one of the recesses I by pressing downward upon the outer end of the pawl O and raising the point thereof out of the notch $D^2$ or $D^3$, in which they may be found engaged. They are now free to be adjusted to their proper positions, and when so adjusted pressure on the pawl is released, when the spring Q by pressing upward on the outer arm of the pawl O will force its point into engagement with one of the notches D³. The catch M is now released from the lug N and the latch L raised, so as to permit the rims of the wheels to be passed between the latch and the upper ends of the uprights H and dropped into one of the recesses I, where they will rest upon the edge of the rubber plates K. The latch L is now depressed until the catch M engages the lug N, in which position the latches L will prevent the wheels from being tilted out of the recesses I, in which they are engaged, the rubber forming the bottom of the recesses preventing the rims of the wheel from being scratched by contact with metal. To remove the wheels, it is only necessary to release the catch M and raise the latch L, when they can be lifted out of the recesses I. When not in use, the brackets E and F are folded against the side of the car, the point of the pawl O engaging in the notches D² and securely holding them in this position, in which they are but little in the way and entirely unobjectionable.

While I have illustrated and described the best means now known to me for carrying out my invention, I do not wish to be understood as restricting myself to the exact details of construction shown and described, but hold that any slight changes or variations such as might suggest themselves to the ordinary mechanic would properly fall within the limit and scope of my invention.

Having thus fully described my invention, what I claim as new, and desire to secure by Letters Patent of the United States, is—

The bicycle-carrier described, comprising the brackets E and F, each provided with vertical pintles, bearing-plates B, B' and C, C' secured to the end of the car at a distance apart to accommodate a bicycle on the brackets, the brackets being provided with horizontal extensions having rubber-lined recesses to receive the rims of the wheels of the bicycle, and the fixed bearing-plates B and C having semicircular horizontal plates notched in their edges, and a horizontally-disposed spring-pawl pivotally secured in lugs projecting from the top of the bracket and normally engaging one of said notches, said plates being further provided with notches in proximity to the front of the car for holding the brackets against said front of the car substantially as described.

GEORGE W. BIESTER.

Witnesses:
JESSE WINGERT,
CONRAD HOWIS.